US009785293B2

(12) United States Patent
Hatano et al.

(10) Patent No.: US 9,785,293 B2
(45) Date of Patent: Oct. 10, 2017

(54) INPUT DEVICE, AND INFORMATION INPUT METHOD OF THE SAME

(71) Applicant: ALPS ELECTRIC CO., LTD., Tokyo (JP)

(72) Inventors: Naoyuki Hatano, Miyagi-Ken (JP); Tomoki Yamada, Miyagi-Ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 330 days.

(21) Appl. No.: 14/538,445

(22) Filed: Nov. 11, 2014

(65) Prior Publication Data

US 2015/0138147 A1 May 21, 2015

(30) Foreign Application Priority Data

Nov. 19, 2013 (JP) ................................. 2013-238686

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

2012/0044204 A1 2/2012 Hashimoto et al.

*Primary Examiner* — Gustavo Polo
(74) *Attorney, Agent, or Firm* — Brinks Gilson & Lione

(57) ABSTRACT

Each of multiple detection data values included in two-dimensional data, generated based on detection results of sensor unit, is converted into either an on data value or an off data value by a data conversion unit. Each data value included in the converted two-dimensional data is sequentially acquired from an edge of an operating face by a region identifying unit, and is determined whether an on data value or not. In a case where determination is made that the acquired data value is an on data value, the acquired data value is set as a starting point, and an outline of a set region where adjacent on data values form a set is tracked in order starting from the starting point until returning to the original starting point again.

6 Claims, 18 Drawing Sheets

FIG. 3A
| | X0 | X1 | X2 | X3 | X4 | X5 | X6 | X7 | X8 | X9 |
|---|---|---|---|---|---|---|---|---|---|---|
| Y0 | 3 | 0 | 4 | 0 | 1 | 0 | 1 | 1 | 0 | 1 |
| Y1 | 1 | 0 | 34 | 25 | 0 | 0 | 2 | 40 | 45 | 1 |
| Y2 | 0 | 29 | 98 | 72 | 26 | 2 | 28 | 75 | 80 | 32 |
| Y3 | 14 | 85 | 99 | 96 | 27 | 0 | 22 | 70 | 60 | 25 |
| Y4 | 4 | 20 | 81 | 33 | 1 | 0 | 8 | 15 | 21 | 5 |
| Y5 | 0 | 0 | 38 | 2 | 4 | 41 | 21 | 28 | 6 | 0 |
| Y6 | 2 | 0 | 5 | 0 | 26 | 99 | 88 | 78 | 33 | 2 |
| Y7 | 0 | 4 | 2 | 0 | 33 | 84 | 92 | 66 | 27 | 0 |
| Y8 | 1 | 0 | 0 | 0 | 9 | 45 | 26 | 34 | 8 | 0 |
FIG. 3B
| | X0 | X1 | X2 | X3 | X4 | X5 | X6 | X7 | X8 | X9 |
|---|---|---|---|---|---|---|---|---|---|---|
| Y0 | 0 | 0 | 0 | 0 | 0 | 0 | 0 | 0 | 0 | 0 |
| Y1 | 0 | 0 | 0 | 0 | 0 | 0 | 0 | 0 | 0 | 0 |
| Y2 | 0 | 0 | 1 | 1 | 0 | 0 | 0 | 1 | 1 | 0 |
| Y3 | 0 | 1 | 1 | 1 | 0 | 0 | 0 | 1 | 1 | 0 |
| Y4 | 0 | 0 | 1 | 0 | 0 | 0 | 0 | 0 | 0 | 0 |
| Y5 | 0 | 0 | 0 | 0 | 0 | 0 | 0 | 0 | 0 | 0 |
| Y6 | 0 | 0 | 0 | 0 | 0 | 1 | 1 | 1 | 0 | 0 |
| Y7 | 0 | 0 | 0 | 0 | 0 | 1 | 1 | 1 | 0 | 0 |
| Y8 | 0 | 0 | 0 | 0 | 0 | 0 | 0 | 0 | 0 | 0 |
FIG. 4
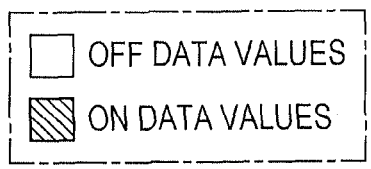

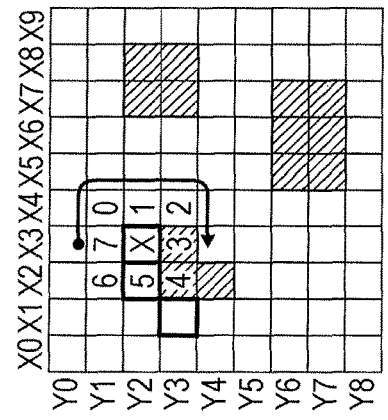
FIG. 7C
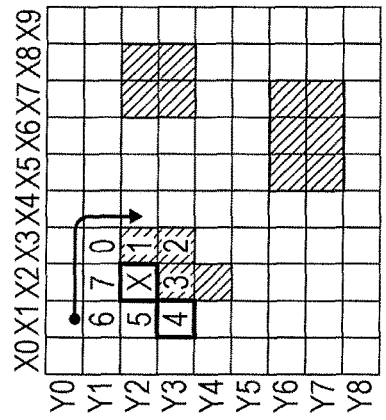
FIG. 7B
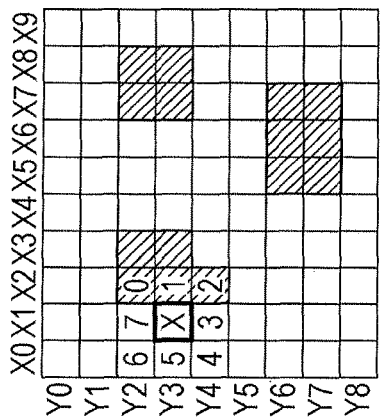
FIG. 7A
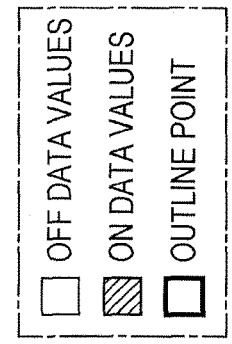
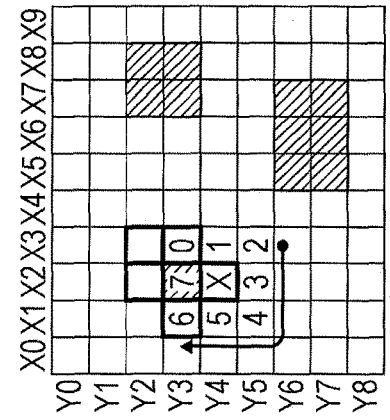
FIG. 7E
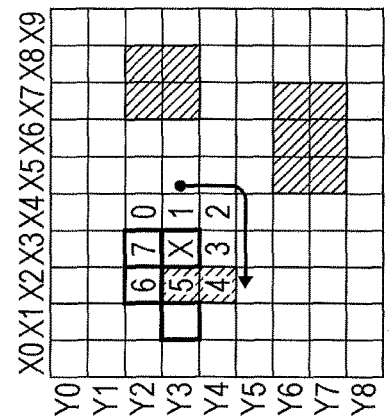
FIG. 7D

FIG. 9A — FIG. 9B — FIG. 9C

FIG. 12
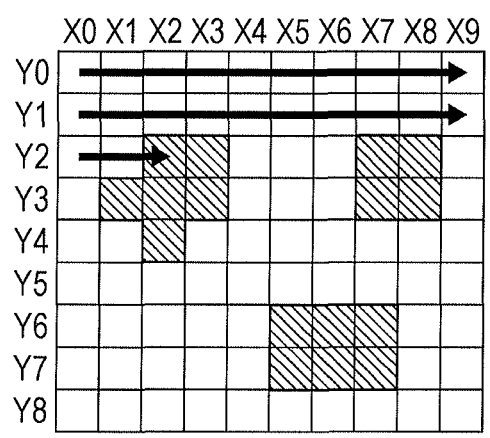
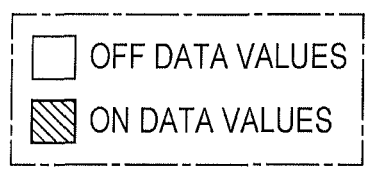

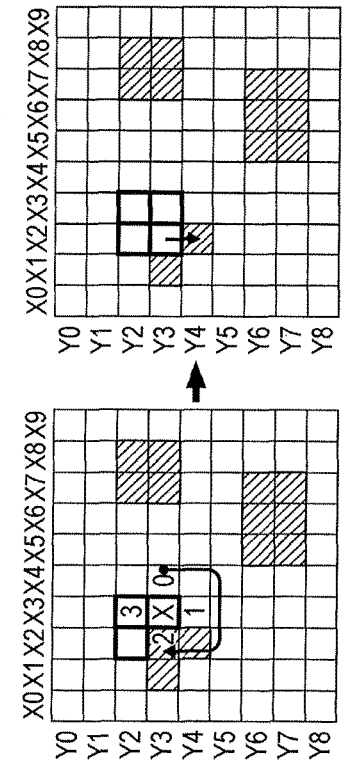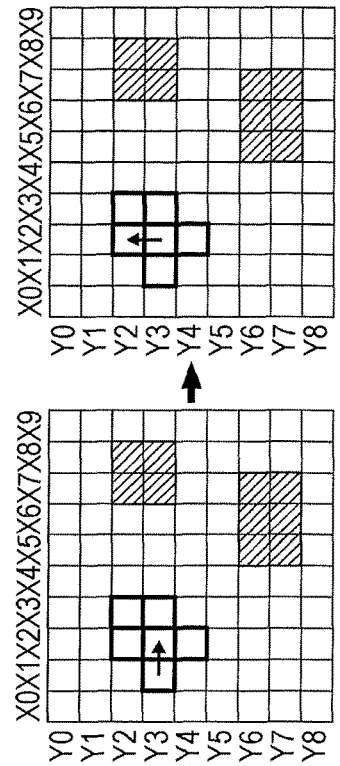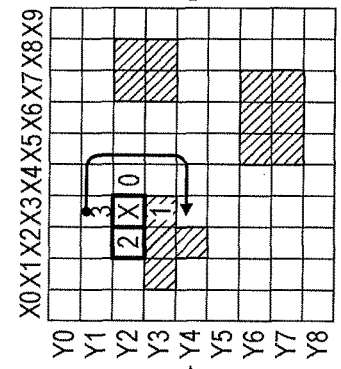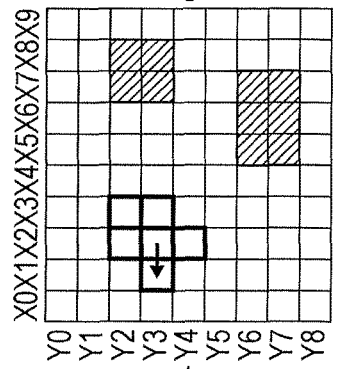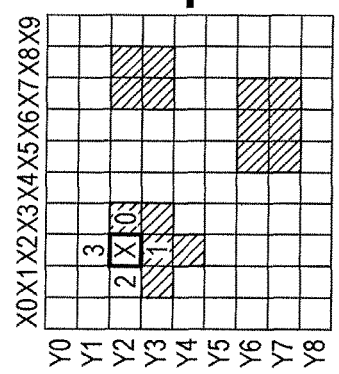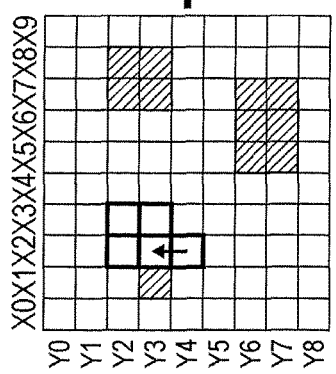

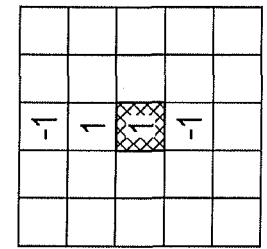 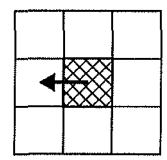
FIG. 16A
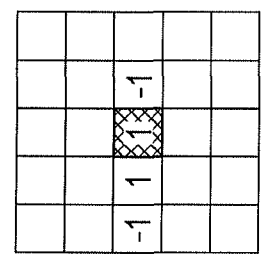 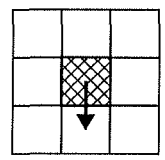
FIG. 16B
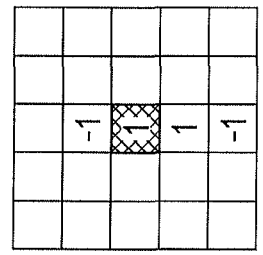 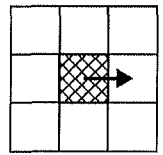
FIG. 16C
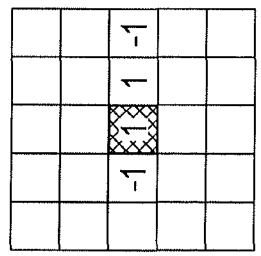 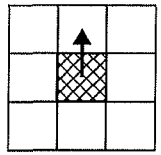
FIG. 16D FIG. 17
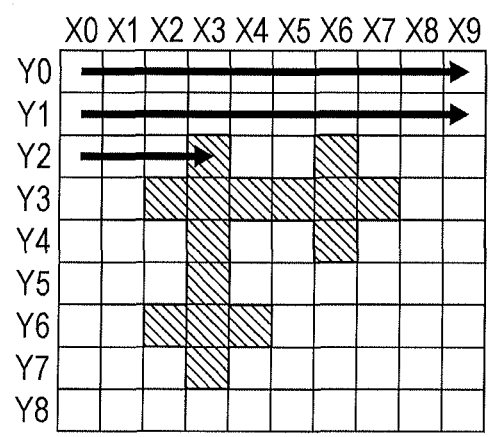
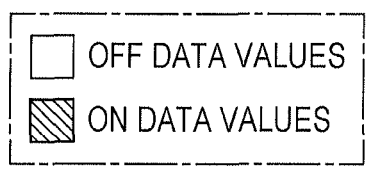

□ OFF DATA VALUES
▨ ON DATA VALUES
▢ OUTLINE POINT

NOT MOVABLE

NOT MOVABLE

INPUT DEVICE, AND INFORMATION INPUT METHOD OF THE SAME

CLAIM OF PRIORITY

This application claims benefit of priority to Japanese Patent Application No. 2013-238686 filed on Nov. 19, 2013, which is hereby incorporated by reference in its entirety.

BACKGROUND

1. Field of the Disclosure

The present disclosure relates to an input device of an information device such as a computer or smartphone or the like and an information input method of the same, and more particularly relates to an input device which identifies a region on an operating face where an object such as a finger or pen has come into contact or into proximity, and inputs information based on the identified region.

2. Description of the Related Art

Devices such as touch pads and touch panels have come into widespread used as input interfaces of information equipment such as laptop personal computers (PCs), tablet terminals, smartphones, and so forth. These devices have sensors to detect contact positions of objects such as a finger or a pen. There are various types of sensors, which detect contact positions of objects, such as resistive film and capacitive types. Recently, there has been increased use of capacitive sensors, which are capable of handling so called "multi-touch", where multiple contact positions are detected.

Common capacitive sensors have multiple electrodes arrayed in a grid pattern, and detect capacitance between electrodes (mutual capacitance) and capacitance between electrodes and a ground (self capacitance). An input device described in Japanese Unexamined Patent Application Publication No. 2012-43395 has multiple X electrodes and multiple Y electrodes arrayed in a grid pattern (FIGS. 1 and 2), with capacitance being detected at positions corresponding to each grid intersection point. One of the X electrodes and Y electrodes is used as driving electrodes, and the other as receiving electrodes. Mutual capacitance at points where the receiving electrodes and driving electrodes intersect is detected in accordance with current flowing through the receiving electrodes when driving pulses are applied to the driving electrodes.

The input device described in Japanese Unexamined Patent Application Publication No. 2012-43395 yields capacitance detection data at each intersection of the X electrodes and Y electrodes arrayed in the grid pattern. Collecting the detection data from each intersection forms two-dimensional data representing the capacitance at each position on the operating face. Information of finger contact positions on the operating face is obtained based on this two-dimensional data. This is performed by scanning the detection data of the two-dimensional data one line at a time, in the horizontal direction, from the bottom to the top. A region where the detection data indicating contact by the finger is consecutive is given the same label in the scanning of each line. This scanning is performed for horizontal lines, in a direction from the bottom to the top and in the opposite direction, and moreover, such scanning is performed for the vertical lines from the left edge to the right edge, and in the opposite direction.

However, this method of scanning the two-dimensional data several times necessitates a broad range of scan history to be stored, which is problematic in that the memory capacity required for this is great, and that the computation load also is great.

SUMMARY

An input device, to input information according to an object coming into contact or proximity with an operating face thereof, includes: a sensor unit configured to detect contact or proximity of an object at a plurality of detection positions distributed on the operating face; a two-dimensional data generating unit configured to generate two-dimensional data made up of a plurality of detection data values representing objects coming into contact or proximity at a plurality of positions on the operating face, based on detection results at the sensor unit; a data conversion unit configured to convert each of the plurality of detection data values included in the two-dimensional data into either of an on data value, which indicates contact or proximity of an object, and an off data value, which indicates no contact or proximity of an object; and a region identifying unit configured to sequentially acquire each converted data value of the two-dimensional data from an edge of the operating face, determine whether or not the on data value, and if an acquired data value is an on data value, set the acquired data value as a starting point, track an outline of a set region outline of a region where adjacent on data values form a set, starting from the starting point and sequentially tracking the outline until returning to the starting point, and identify a region where one object has come into contact or proximity with the operating face, based on the outline tracking results.

According to a second aspect of the present invention, an input device, to input information according to an object coming into contact or proximity with an operating face thereof, includes: a sensor unit configured to detect contact or proximity of an object at a plurality of detection positions distributed on the operating face; a two-dimensional data generating unit configured to generate two-dimensional data made up of a plurality of detection data values representing objects coming into contact or proximity at a plurality of positions on the operating face, based on detection results at the sensor unit; a region identifying unit configured to sequentially acquire each detection data value in the two-dimensional data from an edge of the operating face, determine whether or not the data value indicates contact or proximity of an object, and if an acquired detection data value indicates contact or proximity of an object, set the acquired detection data value as a starting point, track an outline of a set region outline of a region where adjacent detection data values indicating contact or proximity of an object form a set, starting from the starting point and sequentially tracking the outline until returning to the starting point, and identify a region where one object has come into contact or proximity with the operating face, based on the outline tracking results.

According to a third aspect of the present invention, and information input method, performed at an input device to input information according to an object coming into contact or proximity with an operating face thereof, includes: a step to detect a state of contact or proximity of an object at a plurality of detection positions distributed on the operating face; a step to generate two-dimensional data made up of a plurality of detection data values representing objects coming into contact or proximity at a plurality of positions on the operating face, based on detection results at the plurality of detection positions; a step to convert each of the plurality of detection data values included in the two-dimensional data into either of an on data value, which indicates contact or proximity of an object, and an off data value, which indicates no contact or proximity of an object; a step to sequentially acquire each converted data value of the two-dimensional data from an edge of the operating face and determine whether or not the on data value; and a step to, if an acquired data value from the two-dimensional data is determined to be an on data value in the determining step, set the acquired data value as a starting point, track an outline of a set region outline of a region where adjacent on data values form a set, starting from the starting point and sequentially tracking the outline until returning to the starting point, and identify a region where one object has come into contact or proximity with the operating face, based on the outline tracking results.

According to a fourth aspect of the present invention, an information method, performed at an input device to input information according to an object coming into contact or proximity with an operating face thereof, includes: a step to detect a state of contact or proximity of an object at a plurality of detection positions distributed on the operating face; a step to generate two-dimensional data made up of a plurality of detection data values representing objects coming into contact or proximity at a plurality of positions on the operating face, based on detection results at the plurality of detection positions; a step to sequentially acquire each detection data value in the two-dimensional data from an edge of the operating face, and determine whether or not the data value indicates contact or proximity of an object; and a step to, if an acquired detection data value acquired from the two-dimensional data has been determined to indicate contact or proximity of an object, set the acquired detection data value as a starting point, track an outline of a set region outline of a region where adjacent detection data values indicating contact or proximity of an object form a set, starting from the starting point and sequentially tracking the outline until returning to the starting point, and identify a region where one object has come into contact or proximity with the operating face, based on the outline tracking results in the step to determine.

BRIEF DESCRIPTION OF THE DRAWINGS

FIGS. 3A and 3B are diagrams illustrating an example of converting detection data values in two-dimensional data to on data values and off data values, in which FIG. 3A illustrates two-dimensional data before conversion, and FIG. 3B illustrates two-dimensional data after conversion;

FIG. 4 is a diagram illustrating an example processing to search for on data values in two-dimensional data;

FIGS. 7A through 7E are diagrams for describing a specific example of outline tracking;

FIGS. 8A and 8B are diagrams illustrating processing where the inside of an outline obtained by the outline tracking illustrated in FIGS. 7A through 7E is filled in;

FIGS. 9A through 9C are diagrams illustrating processing to update on data values, within a set region obtained by the outline tracking illustrated in FIGS. 7A through 7E, to off data values;

FIG. 12 is a diagram illustrating a modification of processing to search for on data values within two-dimensional data;

FIGS. 13A through 13H are diagrams for describing a specific example of outline tracking in a case of four search directions;

FIGS. 15A and 15B are diagrams illustrating examples of two-dimensional data, in which FIG. 15A illustrates two-dimensional data generated at a two-dimensional data generating unit, and FIG. 15B illustrates two-dimensional data obtained by converting the two-dimensional data in FIG. 15A by a data conversion unit;

FIGS. 16A through 16D are diagrams illustrating examples of coefficients to calculate evaluation values;

FIG. 17 is a diagram illustrating an example of processing to search for on data values within two-dimensional data;

DESCRIPTION OF THE EXEMPLARY EMBODIMENTS

First Embodiment

An input device according to a first embodiment of the present invention will be described with reference to the drawings. The input device is used by a user bringing an object such as a finger or pen into contact or into proximity with an operating face provided with a sensor, thereby inputting information corresponding to the contact or proximal position.

Figure 1:
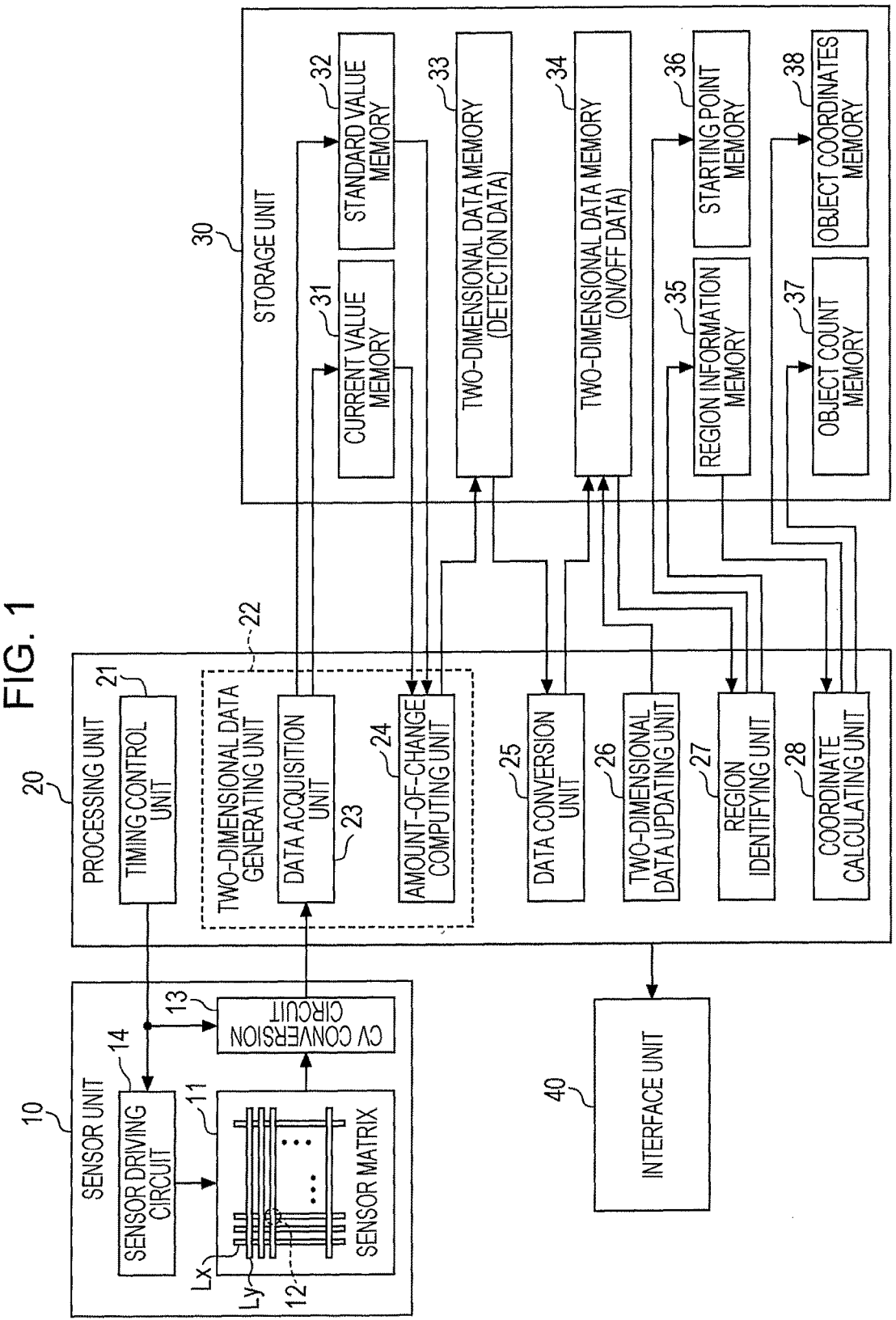
FIG. 1 is a diagram illustrating an example of the configuration of an input device according to a first embodiment.

FIG. 1 is a diagram illustrating an example of the configuration of the input device according to the first embodiment. The input device illustrated in FIG. 1 includes a sensor unit 10, a processing unit 20, a storage unit 30, and an interface unit 40. Note that the term "proximity" as used in the present Specification includes both concepts of being in proximity in a state of being in contact, and being in proximity in a state of not being in contact.

Sensor Unit 10

The sensor unit 10 detects the proximal or contacting state of an object such as a finger or a pen, at multiple detection positions distributed on the operating face. The sensor unit 10 includes, for example, a sensor matrix 11 where multiple capacitive sensor elements 12, of which the capacitance changes by an object being in contact or proximity, being formed into a matrix, a capacitance-voltage conversion circuit (CV conversion circuit) 13 which converts change in capacitance that has occurred at the capacitive sensor elements 12 of the sensor matrix 11 into voltage, and a sensor driving circuit 14 which supplies voltage to the capacitive sensor elements 12 of the sensor matrix 11.

The sensor matrix 11 has multiple electrodes Lx extending in the vertical direction, and multiple electrodes Ly extending in the horizontal direction. The multiple electrodes Lx are arrayed in the horizontal direction in parallel, and the multiple electrodes Ly are arrayed in the vertical direction in parallel. The multiple electrodes Lx and the multiple electrodes Ly intersect to form a grid pattern, with a capacitive sensor element 12 formed at each intersection thereof. One of the electrodes Lx and electrodes Ly serve as driving electrodes, and the other as detecting electrodes.

The sensor driving circuit 14 sequentially selects one driving electrode from the multiple driving electrodes, and applies pulse voltage to that one driving electrode.

The capacitance-voltage conversion circuit 13 sequentially selects one detecting electrode from the multiple detecting electrodes, and transfers a charge, passing through a capacitive sensor element 12 in accordance with application of pulse voltage by the sensor driving circuit 14, from this one detecting electrode to a referencing capacitor. The capacitance-voltage conversion circuit 13 outputs a detection signal corresponding to the capacitance at the capacitive sensor element 12, based on the voltage generated at the referencing capacitor by the charge transferred from the capacitive sensor element 12.

The sensor unit 10 converts the detection signals output from the capacitance-voltage conversion circuit 13 into digital signals at an analog-to-digital converter, which is omitted from illustration, and outputs the digital signals to the processing unit 20 as detection data values.

While the sensor unit 10 is described in the above example as using the capacitances (mutual capacitance) generated between the electrodes as the capacitive sensor elements 12, and detecting contact or proximity of an object by change in the capacitance, this example is not restrictive, and contact or proximity of an object may be detected by various other methods. For example, the sensor unit 10 may detect capacitance generated between electrodes and a ground (self capacitance). The sensor unit 10 further is not restricted to a capacitive type, and may be a resistive film type of electromagnetic inductance type, for example.

Processing Unit 20

The processing unit 20 is a circuit which controls the overall operations of the input device, and includes, for example, a central processing unit (CPU) which performs processing following command code of a program, logic circuits which realize particular functions, and so forth. The processing of the processing unit 20 may all be realized by the CPU based on computer programs, or part or all thereof may be realized by logic circuits.

In the example in FIG. 1, the processing unit 20 includes a timing control unit 21, a two-dimensional data generating unit 22, a data conversion unit 25, a two-dimensional data updating unit 26, a region identifying unit 27, and a coordinate calculating unit 28.

The timing control unit 21 controls the detection timing at the sensor unit 10. Specifically, the timing control unit 21 controls the capacitance-voltage conversion circuit 13 and the sensor driving circuit 14 so that selection of driving electrode and generating of pulse voltage at the sensor driving circuit 14, and selection of detecting electrode and generating of detection signals at the capacitance-voltage conversion circuit 13, are performed at a suitable timing.

The two-dimensional data generating unit 22 generates two-dimensional data made up of multiple detection data values indicating the contact or proximity state of objects at multiple locations on the operating face, based on the detection results of the sensor unit 10. The two-dimensional data is stored in two-dimensional data memory 33 of the storage unit 30.

The two-dimensional data generating unit 22 has a data acquisition unit 23 and an amount-of-change computing unit 24, as illustrated in FIG. 1, for example. The data acquisition unit 23 stores the detection data values output from the sensor unit 10 in current value memory 31 of the storage unit 30, as two-dimensional data in a matrix format. The amount-of-change computing unit 24 computes the difference between each detection data value of the two-dimensional data stored in the current value memory 31 of the storage unit 30 and each detection data value of the two-dimensional data stored in standard value memory 32 of the storage unit 30, for each pair of mutually corresponding detection data values, and stores the computation results thereof in the two-dimensional data memory 33 of the storage unit 30 in a matrix format.

The standard value memory 32 stores beforehand detection data values output from the sensor unit 10 is a state where nothing is in contact or in proximity of the operating face. Accordingly, the detection data values calculated by the amount-of-change computing unit 24 represents the amount of change from the state where no object is in contact or in proximity of the operating face.

Note that each detection data value of the two-dimensional data generated at the two-dimensional data generating unit 22 is not restricted to a data value representing the amount of change from a non-contact state, and may be the same as the detection data value output from the sensor unit 10, for example.

The data conversion unit 25 converts the multiple detection data values included in the two-dimensional data stored in the two-dimensional data memory 33 of the storage unit 30 into "on" data values (e.g., data of a value "1") representing that there is contact or proximity of an object, or "off" data values (e.g., data of a value "0") representing that there is neither contact nor proximity of an object. The conversion results are then stored in two-dimensional data memory 34 of the storage unit 30. For example, the data conversion unit 25 compares a detection data value with a predetermined threshold value, and converts the detection data value in to an on data value or an off data value, according to whether greater than the threshold value or not.

Note that by converting detection data into on data values and off data values based on comparison results with a single threshold value, the conversion results may vary in an unstable manner if the detection data value fluctuates near the threshold value. Accordingly, the data conversion unit 25 may be arranged to convert the detection data values into on data values and off data values, based on the comparison results of the detection data values as to two threshold values distanced by a hysteresis width. That is to say, in a case where a detection data value is not included between the two threshold values (hysteresis range), the data conversion unit 25 converts the detection data value into an on data value or off data value depending on the magnitude relation of the detection data value and the two threshold values. On the other hand, in a case where a detection data value is included in the hysteresis range, the data conversion unit 25 takes on the previous conversion results (on data value off data value) stored separately in the two-dimensional data memory 34 as the conversion results for this time. Thus, providing a hysteresis range where conversion results from the previous time in the determination by threshold value can make it harder for unstable change of conversion results, such as described above, to occur.

The region identifying unit 27 references the two-dimensional data obtained by each detection data value being converted into an on data value or an off data value by the data conversion unit 25, and tracks the outline of a region where adjacent on data values form a set (hereinafter may be referred to simply as "set region"), thereby identifying a region where an object has come into contact or proximity.

Specifically, the region identifying unit 27 acquires each data value from the two-dimensional data stored in the two-dimensional data memory 34 of the storage unit 30 in order from an edge of the operating face, and determines whether an on data value or not. In a case where the acquired data value is an on data value, the region identifying unit 27 sets the acquired data value as a starting point, and stores the coordinates thereof in starting point memory 36 of the storage unit 30. The region identifying unit 27 tracks the outline of the set region where adjacent on data values form a set, starting from this starting point in order until returning to this starting point again. The region identifying unit 27 identifies a region where one object has come into contact or proximity with the operating face, based on the outline tracking results, and stores information relating to the identified region in region information memory 35 of the storage unit 30.

Also, after having performed outline tracking of the on set region, in a case where the on data values belonging to this set region are updated to off data values by the later-described two-dimensional data updating unit 26, and there is still remaining data in the two-dimensional data stored in the two-dimensional data memory 34 of the storage unit 30 regarding which determination of whether on data values or not has not been made, the region identifying unit 27 sequentially acquires the undetermined data values in order, and performs determination of whether on data values or not. In a case where an acquired data values is an on data value, the region identifying unit 27 takes the acquired data value as a new starting point and performs outline tracking of a set region in the same way as described above, so as to identify a region where an object has come into contact or proximity with the operating face, based on the results of this outline tracking.

Each time outline tracking of a set region is performed by the region identifying unit 27, the two-dimensional data updating unit 26 updates (rewrites) the on data values belonging to the set region which has been the subject of the outline tracking in the two-dimensional data stored in the two-dimensional data memory 34 of the storage unit 30, to off data values.

The on data values included in the two-dimensional data stored in the two-dimensional data memory 34 is gradually updated to off data values, by the outline tracking and identifying of contact regions (proximity regions) by the region identifying unit 27, and updating of the two-dimensional data by the two-dimensional data updating unit 26, being repeatedly performed. Upon all contact regions and proximity regions where an object has come into contact or proximity with the operating screen being identified, all data values included in the two-dimensional data have become off data values. In a case of performing conversion at the data conversion unit 25 using a hysteresis range such as described above, the conversion results form the previous type need to be referenced for the conversion, so in this case, two-dimensional data may be stored in the two-dimensional data memory 34 for the data conversion unit 25 to reference, separately from the two-dimensional data to be converted by the two-dimensional data updating unit 26.

The coordinate calculating unit 28 computes the coordinates on the operating screen where the object has come into contact or proximity, based on the contact region or proximity region of the object identified by the region identifying unit 27. For example, the coordinate calculating unit 28 creates profile data for each of the horizontal direction (direction in which the electrodes Lx are arrayed) and vertical direction (direction in which the electrodes Ly are arrayed). The profile data in the horizontal direction is obtained by calculating the sum of detection data in one group in the vertical direction of the operating screen for each column, and arraying the sums of detection data in order in the horizontal direction of the operating screen. The profile data in the vertical direction is obtained by calculating the sum of detection data in one group in the horizontal direction of the operating screen for each row, and arraying the sums of detection data in order in the vertical direction of the operating screen. The coordinate calculating unit 28 calculates the peak position and center-of-gravity position of the detection data, for each of the horizontal direction profile data and vertical direction profile data. The positions in the horizontal direction and positions in the vertical direction obtained by this computation represent the coordinates where objects have come into contact or proximity with the operating face. The coordinate calculating unit 28 stores the coordinate data obtained by such computation in object coordinates memory 38 of the storage unit 30. The coordinate calculating unit 28 also stores the number of objects regarding which coordinates on the operating face have been obtained, in object count memory 37 of the storage unit 30.

Storage Unit 30

The storage unit 30 stores constant values data and variable values data used in processing by the processing unit 20. In a case where the processing unit 20 includes a CPU, programs executed by the CPU may also be stored in the storage unit 30. The storage unit 30 is configured including, for example, volatile memory such as random access memory (RAM), dynamic RAM (DRAM), or the like, or nonvolatile memory such as flash memory or the like.

Interface Unit 40

The interface unit 40 is a circuit to exchange data between the input device and other control devices (a controller integrated circuit (IC) installed in the an information device in which the input device has been installed, or the like). The processing unit 20 outputs information (coordinates of objects, number of objects, etc.) stored in the storage unit 30 from the interface unit 40 to a control device which is omitted from illustration.

Figure 2:
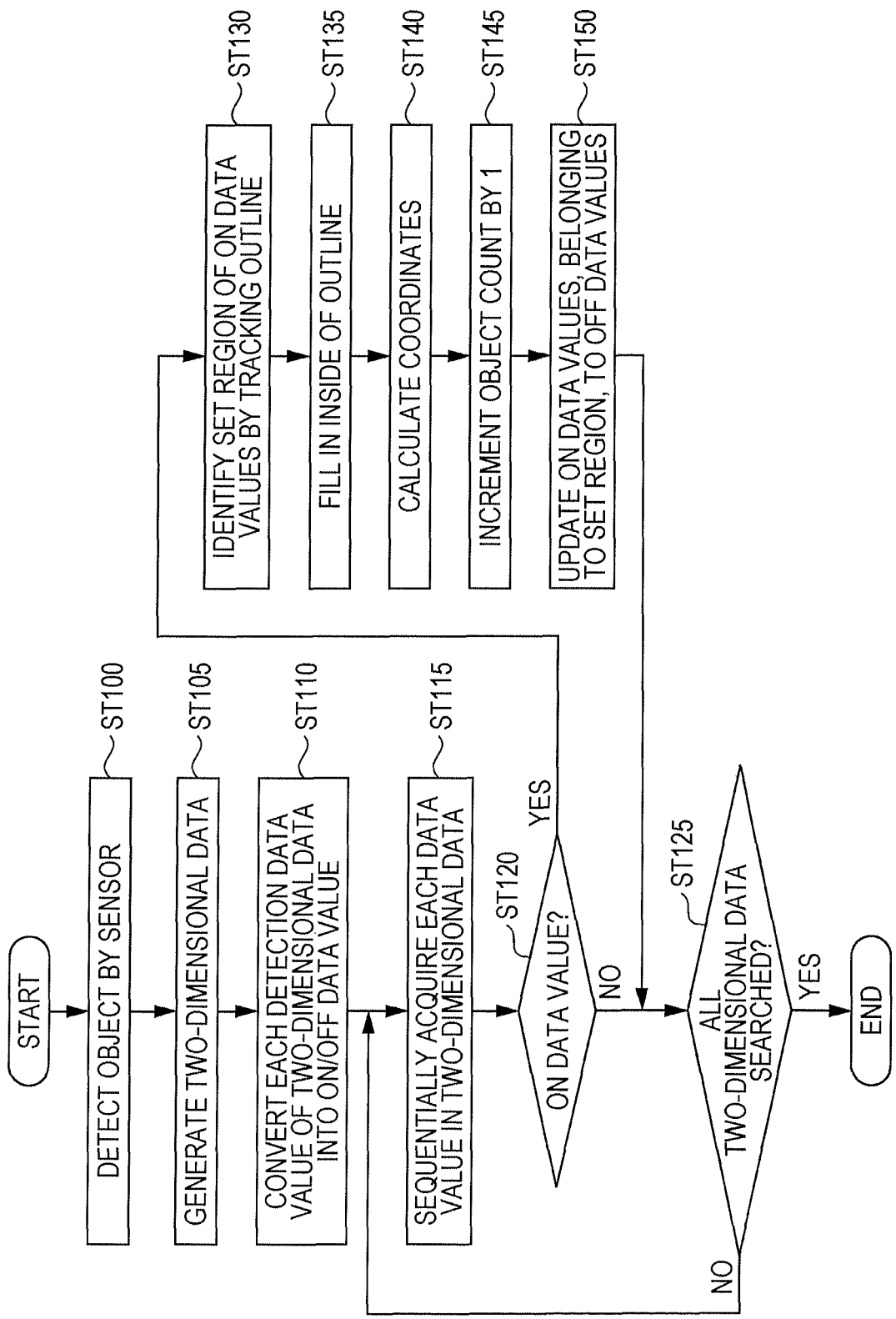
FIG. 2 is a flowchart for describing operations of the input device according to the first embodiment.

The operations of the input device of which the configuration has been described above, are illustrated with reference to the flowchart in FIG. 2. The flowchart in FIG. 2 illustrates processing which is executed each time detection of the entire face of the operating face of the sensor unit 10 is performed. In a case of being applied to operating an information device such as a smartphone, this processing is repeatedly executed at predetermined time intervals.

ST100

The timing control unit 21 of the processing unit 20 controls the sensor unit 10 so that detection data is obtained at the multiple detection positions distributed on the entire face of the operating face. The sensor driving circuit 14 of the sensor unit 10 selects a driving electrode of the multiple driving electrodes of the sensor matrix 11 in order, and applies pulse voltage, under control of the timing control unit 21. The capacitance-voltage conversion circuit 13 selects a detecting electrode of the multiple detecting electrodes of the sensor matrix 11 in order, each time one driving electrode is selected and driven, and outputs detection signals having voltage corresponding to the capacitance of the capacitive sensor elements 12 at the intersections of the driving electrodes and detecting electrodes. The sensor unit 10 converts detection signals sequentially output from the capacitance-voltage conversion circuit 13 into digital signals, and outputs to the processing unit 20 as detection data. The two-dimensional data generating unit 22 of the processing unit 20 stores the detection data sequentially output from the sensor unit 10 in the current value memory 31 of the storage unit 30 in a matrix format.

ST105

Upon the detection data of the entire face of the operating face being stored in the current value memory 31 in a matrix format as two-dimensional data, the two-dimensional data generating unit 22 computes the difference between each detection data value stored in the current value memory 31 and each detection data value stored in standard value memory 32 (detection data for when no object is in contact with the operating face), for each pair of mutually corresponding detection data values (detection data values at the same position on the operating face). The detection data obtained as the result of the computation represents the amount of change from a state where no object is in contact. The two-dimensional data generating unit 22 stores two-dimensional data made up of detection data values representing this amount of change in the two-dimensional data memory 33 of the storage unit 30.

ST110

The data conversion unit 25 converts each detection data value included in the two-dimensional data stored in the two-dimensional data memory 33 into an on data value or an off data value, and stores the conversion results thereof in the two-dimensional data memory 34.

FIGS. 3A and 3B are diagrams illustrating an example of converting detection data values in two-dimensional data to on data values and off data values. FIG. 3A illustrates two-dimensional data before conversion, and FIG. 3B illustrates two-dimensional data after conversion. In the example illustrated in FIGS. 3A and 3B, detection data values greater than the threshold value "50" are converted in to on data (value "1"), and detection data values equal to or smaller than the threshold value "50" are converted in to off data (value "0").

ST115, ST120

The region identifying unit 27 sequentially obtains each data value of the two-dimensional data stored in the two-dimensional data memory 34 from the edge of the operating face (ST115), and determines whether or not an on data value (ST120). In a case where the obtained data value is an on data value, the region identifying unit 27 performs the processing of steps ST130 through ST150 which will be described later. FIG. 4 is a diagram illustrating an example of processing performed by the region identifying unit 27 to search for on data values in the two-dimensional data. In the example in FIG. 4, columns are selected in order from the left end of the operating face to the right end, search for on data values has been performed from the top toward the bottom of each selected column, and the first on data value has been found at the position of coordinates (X1, Y3).

ST130

Upon an on data value being found in the two-dimensional data by the search in steps ST115 and ST120, the region identifying unit 27 performs processing to track the outlines of the set region of on data values, with that on data value as the starting point.

Figure 5:
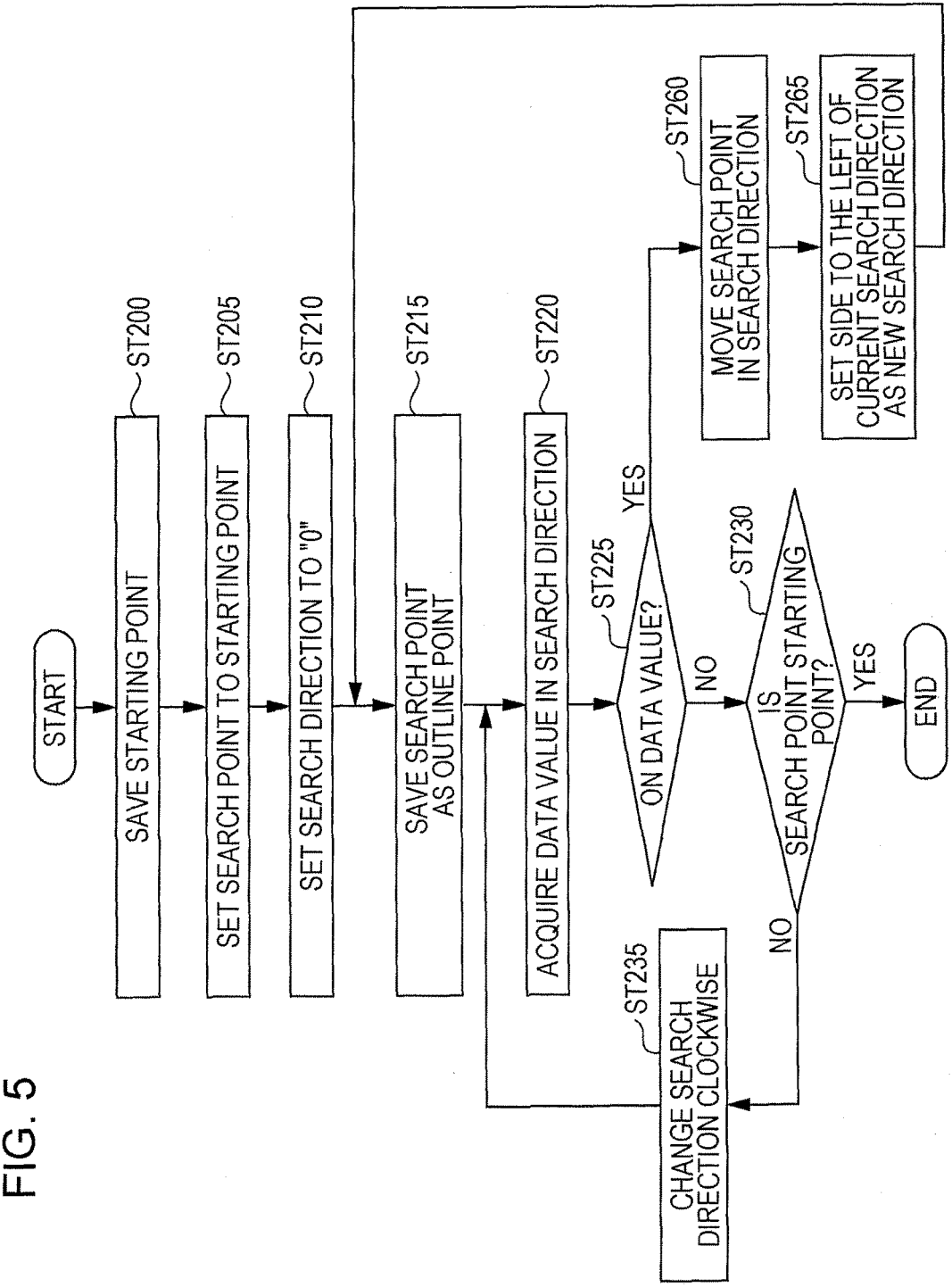
FIG. 5 is a flowchart for describing an example of outline tracking processing by the input device according to the first embodiment.

FIG. 5 is a flowchart for describing an example of outline tracking processing by the input device according to the present embodiment. The region identifying unit 27 stores the coordinates of the on data value found by the search in steps ST115 and ST120 in the starting point memory 36 (ST200), as the coordinates of the starting point for outline tracking. The region identifying unit 27 also sets this starting point as the first search point (ST205), and also sets a search direction instructing the position of the next search point candidate from that search point, in the direction of "0" (upper right direction) defined in FIG. 6 (ST210).

Figure 6:
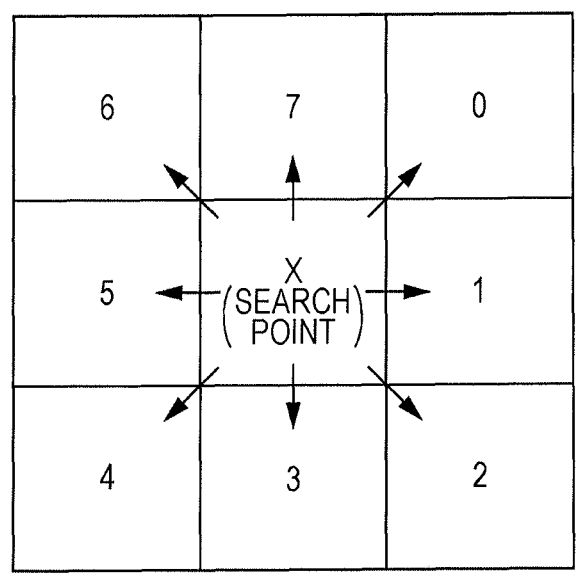
FIG. 6 is a diagram illustrating an example of search directions to be set in outline tracking.

FIG. 6 is a diagram illustrating an example of search directions which can be set in the outline tracking. In the example in FIG. 6, eight directions centered on the search point (upper right, right, lower right, down, lower left, left, upper left, and up) can be set as search directions, each direction being assigned a numeral of "0" through "7".

The region identifying unit 27 also saves the search point in the region information memory 35 as an outline point (ST215). The region information memory 35 stores two-dimensional data in which outline points are represented by "1" and other points by "0". The region identifying unit 27 rewrites data values corresponding to search points in this two-dimensional data to "1".

Next, the region identifying unit 27 acquires a data value in the search direction from the two-dimensional data in the two-dimensional data memory 34 (ST220), and determines whether an on data value or not (ST225). In the case where the data value in the search direction is an on data value, the region identifying unit 27 moves the search point in the search direction (ST260), and sets the left side toward the search direction as a new search direction (ST265).

For example, in a case where the search point is moved to "0" (upper right), the region identifying unit 27 sets "6" which is the left side of that direction, as the new search direction. The new search direction is "7" if the search point has been moved to "1", and the new search direction is "0" of the search point has been moved to "2". That is to say, the value indicating the new search direction can be obtained by adding "6" to the value of the current search direction, dividing the added result by "8", and taking the residual as the value indicating the new search direction.

Upon newly setting the search point and search direction, the region identifying unit 27 returns to step ST215 again, and saves the search point in the region information memory 35 as an outline point. The region identifying unit 27 then acquires data in the newly-set search direction from the two-dimensional data memory 34 (ST220), and determines whether or not an on-data value (ST225).

In a case where determination is made that the data value acquired from the two-dimensional data memory 34 is not an on data value (ST225), the region identifying unit 27 determines whether or not the current search point is the starting point (ST230) and if not the starting point, changes the search direction in the clockwise direction (ST235). That is to say, if the search direction is "0", the search direction is changed to "1", if the search direction is "1", to "2", if the search direction is "2", to "3", if the search direction is "3", to "4", if the search direction is "4", to "5", if the search direction is "5", to "6", if the search direction is "6", to "7", and if the search direction is "7", to "0".

After the search direction is changed to clockwise, the region identifying unit 27 returns to step ST220, acquires the data value in the changed search direction from the two-dimensional data memory 34, and determines whether an on data value or not (ST225).

In a case where the data value in the search direction is not an on data value (ST225) and also the current search point is the starting point (ST230), the region identifying unit 27 determines that outline tracking of the set region has been completed, and ends the processing.

FIGS. 7A through 7E are diagrams for describing a specific example of the above-described outline tracking. The two-dimensional data subjected to the outline tracking in FIGS. 7A through 7E is the same as that illustrated in FIG. 4.

First, the region identifying unit 27 searches through the two-dimensional data as illustrated in FIG. 4, and takes the coordinates where the first on data value is found (X1, Y3) as the starting point for outline tracking. The region identifying unit 27 sets this starting point as a search point, and sets the direction of "0" as the first search direction (FIG. 7A). There is an on data value in the direction of "0", so the region identifying unit 27 moves the search point to coordinates (X2, Y2) (FIG. 7B).

Due to having moved the search point in the search direction "0", the region identifying unit 27 takes the direction "6", which is to the left side of the direction "0", as the new search direction. The region identifying unit 27 searches for an on data value while rotating the search direction clockwise from this direction "6". The first on data value found by this search is in the direction "1", so the region identifying unit 27 moves the search point in the direction "1". Accordingly, the new search point moves to coordinates (X3, Y2) (FIG. 7C).

Due to having moved the search point in the search direction "1", the region identifying unit 27 takes the direction "7", which is to the left side of the direction "1", as the new search direction. The region identifying unit 27 searches for an on data value while rotating the search direction clockwise from this direction "7". The first on data value found by this search is in the direction "3", so the region identifying unit 27 moves the search point in the direction "3". Accordingly, the new search point moves to coordinates (X3, Y3) (FIG. 7D).

Due to having moved the search point in the search direction "3", the region identifying unit 27 takes the direction "1", which is to the left side of the direction "3", as the new search direction. The region identifying unit 27 searches for an on data value while rotating the search direction clockwise from this direction "1". The first on data value found by this search is in the direction "4", so the region identifying unit 27 moves the search point in the direction "4". Accordingly, the new search point moves to coordinates (X2, Y4) (FIG. 7E).

Due to having moved the search point in the search direction "4", the region identifying unit 27 takes the direction "2", which is to the left side of the direction "4", as the new search direction. The region identifying unit 27 searches for an on data value while rotating the search direction clockwise from this direction "2". The first on data value found by this search is in the direction "6", so the region identifying unit 27 moves the search point in the direction "6". Accordingly, the new search point moves to the starting point at coordinates (X1, Y3).

Due to having moved the search point in the search direction "6", the region identifying unit 27 takes the direction "4", which is to the left side of the direction "6", as the new search direction, but the data value in this search direction is an off data value. The search point and the starting point are thus equal, and the search direction is "4", so the region identifying unit 27 ends the outline tracking processing.

This so far has been a description of the outline tracking processing (ST130) in the flowchart in FIG. 2.

ST135

Upon the outline tracking ending, the region identifying unit 27 performs processing to fill in the inside of the outline. That is to say, the region identifying unit 27 searches for points in the two-dimensional data stored in the region information memory 35 that are on the inner side of the outline, and sets the found points to "1".

Figures 8A, 8B:
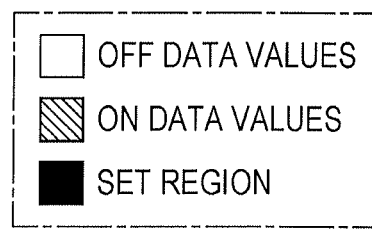

FIGS. 8A and 8B are diagrams illustrating processing where the inside of an outline obtained by the outline tracking illustrated in FIGS. 7A through 7E is filled in. In a case where an outline surrounding coordinates (X2, Y3) has been obtained by the outline tracking in FIGS. 7A through 7E (FIG. 8A), the region identifying unit 27 sets the data value of the coordinates (X2, Y3) to "1" (FIG. 8B). Thus, the two-dimensional data in the region information memory 35 becomes data identifying a solid region where a single object has come into contact or proximity, by filling in the inside of the outline with the same data values.

ST140

Upon a solid region where a single object has come into contact or proximity being identified by the region identifying unit 27 and two-dimensional data indicating that region being stored in the region information memory 35, the coordinate calculating unit 28 calculates the coordinates on the operating face where the object has come into contact or proximity, based on the two-dimensional data stored in the region information memory 35. For example, the coordinate calculating unit 28 creates horizontal direction profile data and vertical direction profile data of the region which the two-dimensional data stored in the region information memory 35 indicates, calculates the peak position and center-of-gravity position of detection data values for each profile data, and obtains coordinates indicating the position in the horizontal direction and vertical direction. The region identifying unit 27 then stores the information of the coordinates obtained by computation in the object coordinates memory 38.

ST145

Upon having calculated the coordinates indicating the position of the object, the coordinate calculating unit 28 increments the value of the object count stored in the object count memory 37 by 1.

ST150

Upon outline tracking of a set region of on data values being performed by the region identifying unit 27, the two-dimensional data updating unit 26 updates the on data values belonging to the set region in the two-dimensional data stored in the two-dimensional data memory 34 which has been subjected to the outline tracking, to on data values. For example, the two-dimensional data updating unit 26 searches, from the two-dimensional data stored in the two-dimensional data memory 34, a region the same as the region, which the two-dimensional data stored in the region information memory 35 represents, and rewrites all data values the searched data into off data values.

Figure 9A:
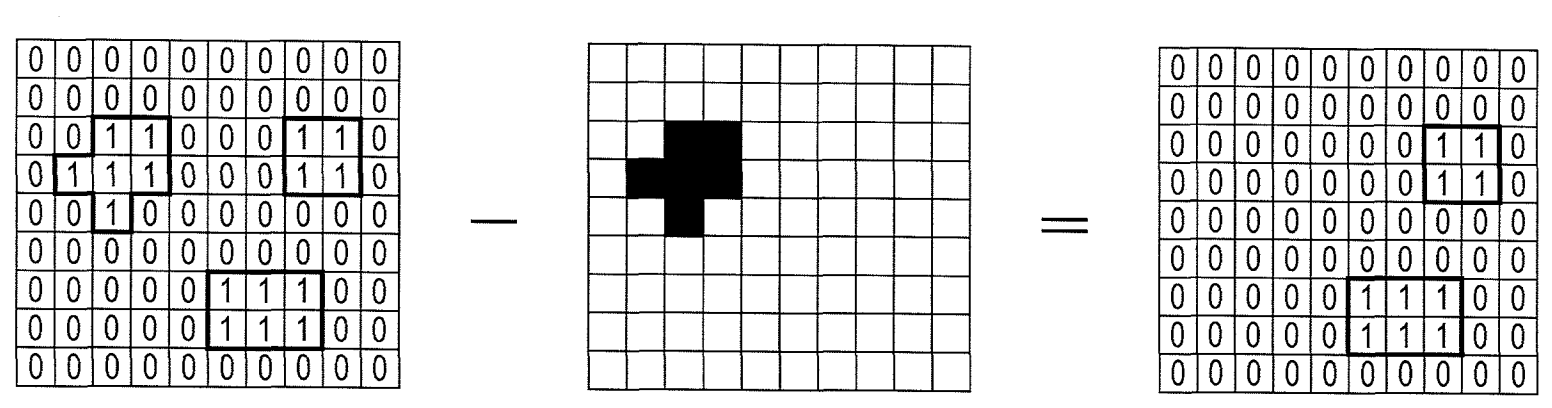

FIGS. 9A through 9C are diagrams illustrating processing to update on data values, within a set region obtained by the outline tracking illustrated in FIGS. 7A through 7E, to off data values. FIG. 9A illustrates the two-dimensional data stored in the two-dimensional data memory 34, FIG. 9B illustrates the two-dimensional data stored in the region information memory 35, and FIG. 9C illustrates two-dimensional data after updating by the two-dimensional data updating unit 26.

By thus updating on data of a set region where outline tracking has been performed into off data, even in a case where multiple objects have come into contact or proximity with the operating face, the contact region or proximity region of each object can be identified by outline tracking.

ST125

In a case where determination is made in step ST120 that a data value acquired from the two-dimensional data in the two-dimensional data memory 34 is an off data value, or, in a case where the processing of steps ST130 through ST150 has been executed due to having determined that the data value obtained from the two-dimensional data is an on data value, the region identifying unit 27 returns to step ST115 if there is a data value remaining in the two-dimensional data regarding which determination of whether or not an on data value (ST120) has not been performed, acquires the undetermined data value from the two-dimensional data, and performs the determination of step ST120. In a case where an on data value is found in this determination, the region identifying unit 27 executes the processing of steps ST130 through ST150 in the same way as above. In a case where the determination of step ST120 has been performed for all data values in this two-dimensional data, the region identifying unit 27 ends the processing regarding this two-dimensional data.

As described above, according to the input device of the present embodiment, each of multiple detection data values included in two-dimensional data generated based on detection results at the sensor unit 10 is converted at the data conversion unit 25 into either of an on data value and an off data value. Each converted data value included in the converted two-dimensional data is sequentially acquired from an edge of the operating face by the region identifying unit 27, and whether or not an on data value is determined. If the region identifying unit 27 determines an acquired data value to be an on data value, the acquired data value is set as a starting point, and an outline of a set region outline of a region where adjacent on data values form a set is tracked, starting from the starting point and sequentially tracking the outline until returning to the starting point. A region where one object has come into contact or proximity with the operating face is identified, based on the outline tracking results.

Accordingly, processing to identify a contact (proximity) region is performed narrowed down to a part of the two-dimensional data (around the outline of an on data set region), so memory capacity necessary for processing is reduced, and the computing load is smaller.

The input device of the present embodiment preferably further updates on data values, belonging to the set region in the two-dimensional data of which the outline has been tracked in the two-dimensional data converted by the data conversion unit 25, into off data values by the two-dimensional data updating unit 26, each time outline tracking of the set region is performed by the region identifying unit 27. In a case where a data value regarding which determination has not been made yet by the region identifying unit 27 regarding whether or not an on data value exists in the converted two-dimensional data when the updating of the two-dimensional data is performed by the two-dimensional data updating unit 26, the region identifying unit 27 may sequentially acquire this unidentified data value and perform determining whether an on data value or not. Each time an on data value is found in the determination by the region identifying unit 27, the outline tracking may be performed with this acquired on data value as a new starting point, to identify a region where an object has come into contact or proximity with the operating face.

Accordingly, even in a case of contact or proximity of multiple objects with the operating face at the same time, the contact region or proximity region of each object can be accurately identified. Also, contact regions or proximity regions of objects are identifying while rewriting a part of the two-dimensional data stored in the two-dimensional data memory 34 (two-dimensional data after conversion to on data values and off data values), so memory capacity necessary for processing can be reduced, and the computing load can be made smaller.

Figure 10:
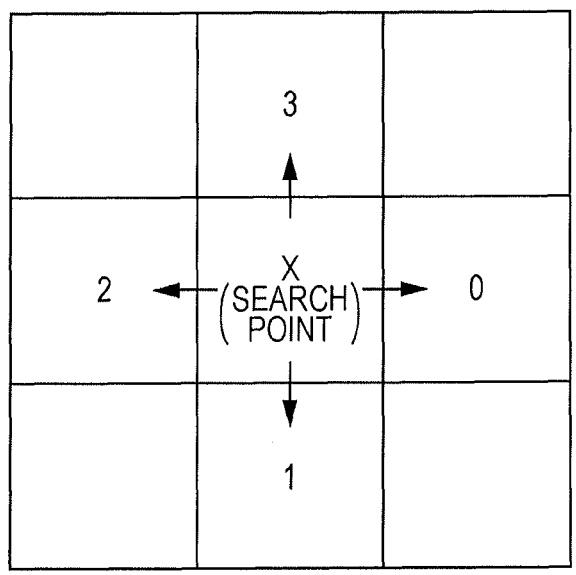
FIG. 10 is a diagram illustrating an another example of search directions to be set in outline tracking.

Next, a modification of the input device according to the present embodiment will be described. While an example of setting eight directions in the perimeter of the search point in the outline tracking as search directions has been described in the embodiment above (FIG. 6), the search directions can be optionally changed, and the search directions may be set to the four directions in the perimeter of the search point, as illustrated in FIG. 10 for example.

Figure 11:
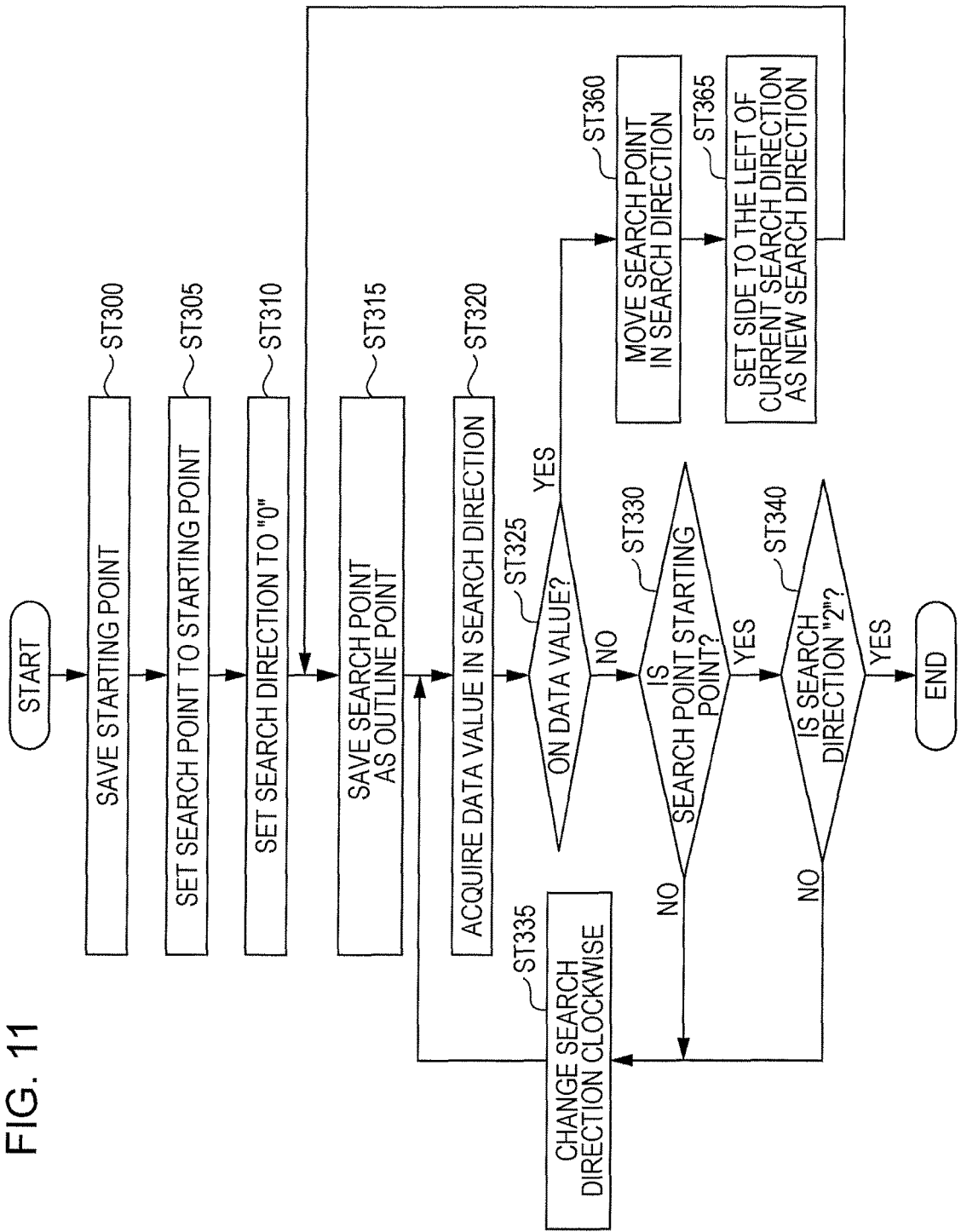
FIG. 11 is a flowchart for describing a modification of outline tracking processing in an input device according to the first embodiment.

FIG. 11 is a flowchart for describing a modification of the outline tracking processing by the input device according to the present embodiment. Steps ST300 through ST365 in the flowchart in FIG. 11 each correspond to steps ST200 through ST265 in the flowchart in FIG. 5, and generally the same processing is performed. Note however, that the initial value "0" of the search direction set in step ST310 is the right direction, as illustrated in FIG. 10.

Also, in a case of changing the search direction in the clockwise direction in step ST335, if the search direction is "0" this is changed to "1", if the search direction is "1" this is changed to "2", if the search direction is "2" this is changed to "3", and if the search direction is "3" this is changed to "0".

Further, in a case where a new search direction is to be set to the left side of the original search direction in step ST365, if the search point is moved to "0" the new search direction is "3", if the search point is moved to "1" the new search direction is "0", if the search point is moved to "2" the new search direction is "1", and if the search point is moved to "3" the new search direction is "2". That is to say, the numerical value indicating the new search direction can be obtained by adding "3" to the numerical value of the current search direction, dividing the result by "4", and taking the residual as the numerical value indicating the new search direction.

Also, in a case of performing outline tracking processing following the flowchart illustrated in FIG. 11, search of on data by the region identifying unit 27 (ST115, FIG. 2) is performed in the order illustrated in FIG. 12. In the example in FIG. 12, rows are selected from the top to the bottom of the operating face, and on data values are searched in order from the left end to the right end of the selected row, with the first on data value having been found at the position of coordinates (X2, Y2).

FIGS. 13A through 13H are diagrams for describing a specific example of outline tracking in a case of four search directions. The two-dimensional data regarding which outline tracking is performed in the specific example in FIGS. 13A through 13H is the same as that illustrated in FIG. 12.

First, the region identifying unit 27 searches for two-dimensional data as illustrated in FIG. 12, and takes the data value at the coordinates (X2, Y2) where the first on data values is found, as the stating point for outline tracking. The region identifying unit 27 uses this starting point as a search point, and sets the direction "0 (right)" as the first search direction (FIG. 13A). There is an on data value in the direction "0 (right)", so the region identifying unit 27 moves the search point to coordinates (X3, Y2) (FIG. 13B).

The search point has been moved to the search direction "0 (right)", so the region identifying unit 27 sets the direction "3 (up)", which is to the left of the direction "0 (right)", as the new search direction. The region identifying unit 27 rotates the search direction in the clockwise direction from the direction "3 (up)", and searches for an on data value. The first on data value found by this search is in the direction "1 (down)", so the region identifying unit 27 moves the search point in the direction "1 (down)". Thus, the new search point moves to coordinates (X3, Y3) (FIG. 13C).

The search point has been moved to the search direction "1 (down)", so the region identifying unit 27 sets the direction "0 (right)", which is to the left of the direction "1 (down)", as the new search direction. The region identifying unit 27 rotates the search direction in the clockwise direction from the direction "0 (right)", and searches for an on data value. The first on data value found by this search is in the direction "2 (left)", so the region identifying unit 27 moves the search point in the direction "2 (left)". Thus, the new search point moves to coordinates (X2, Y3) (FIG. 13D).

Thereafter, the search point is moved to "1 (down)", "3 (up)", "2 (left)", "0 (right)", and "3 (up)", in the same way, returning to the coordinates (X2, Y2) at the original starting point (FIGS. 13D through 13H). The search point has moved in the search direction "3 (up)" and thus returned to the starting point, so the region identifying unit 27 takes the direction "2 (left)" which is to the left of the direction "3 (up)", as a new search direction, but the data value in this search direction is an off data value. The search point is equal to the starting point, and the search direction is "2 (left)", so the region identifying unit 27 ends the outline tracking processing.

In a case where four search directions are used as in this modification, and oblique directions are not used as search directions, the search point may return to the starting point partway through the outline tracking. Ending the outline tracking due to the search point having returned to the starting point results in incomplete outline tracking. Accordingly, the outline tracking is not ended by continued in all cases except for when the search direction in step ST340 is "2 (left)", to avoid such a situation.

In a case where the search direction in step ST340 is "2 (left)", there is only off data values in all directions of "2 (left)" through "3 (up)" as seen from the starting point, which can be understood from the search for on data values illustrated in FIG. 12. Accordingly, it is clear that on data values cannot be found in these directions by rotating the search direction clockwise. Thus, determination is made that the outline tracking of the set region has been completed in this case, and the processing ends.

Accordingly, the outline of a set region of on data values can be tracked even if the search directions from the search point is restricted to four directions, so a contact region or proximity region of an object can be identified.

Second Embodiment

Next, a second embodiment of the present invention will be described. The input device according to the second embodiment has the same configuration as the above-described input device illustrated in FIG. 1, but differs from the input device illustrated in FIG. 1 with regard to region identifying processing by the region identifying unit 27.

Figure 14:
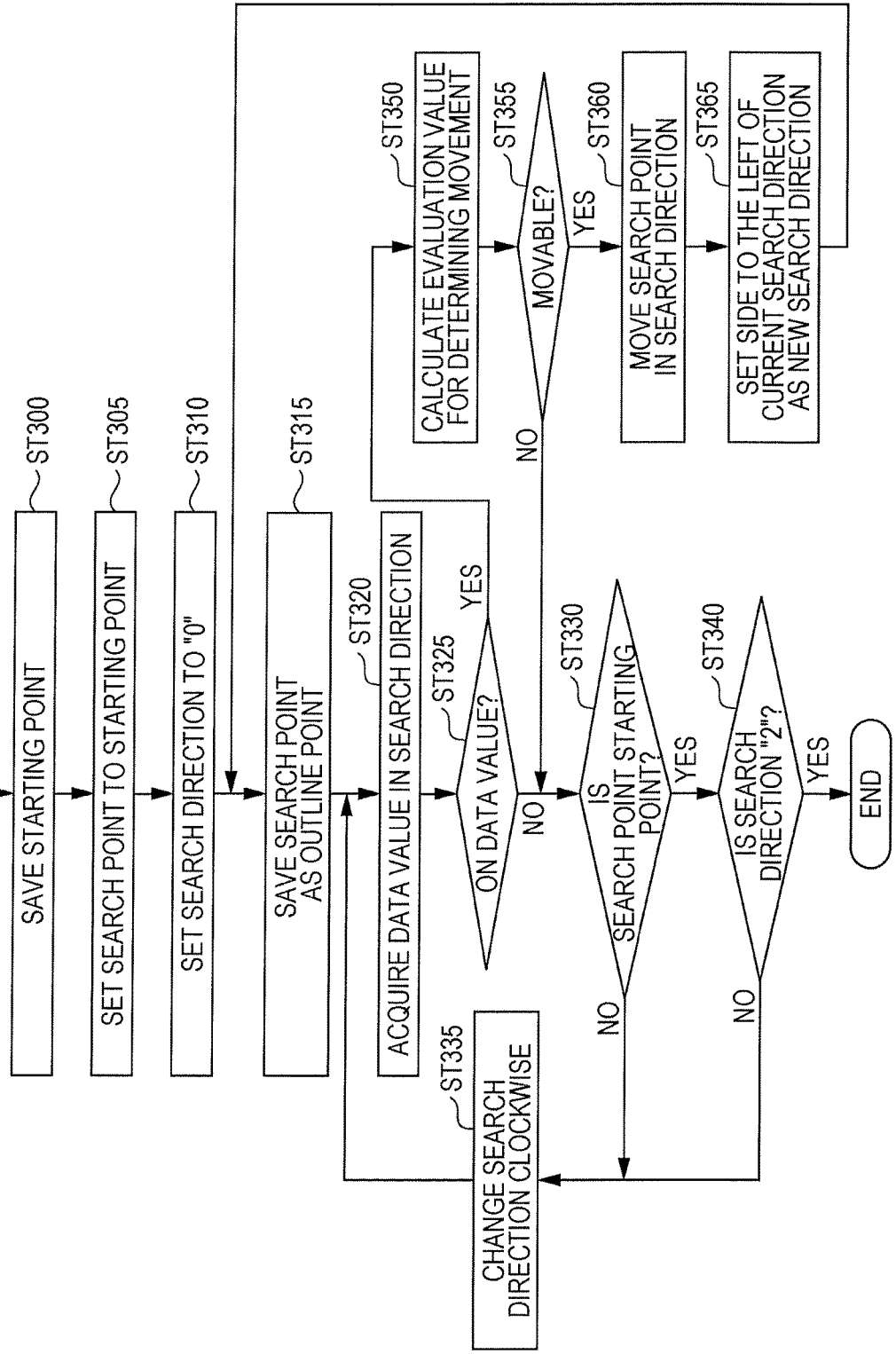
FIG. 14 is a flowchart for describing an example of outline tracking processing by the input device according to a second embodiment.

FIG. 14 is a flowchart for describing an example of outline tracking processing by the input device according to the second embodiment. The flowchart in FIG. 14 has the steps ST300 through ST365, which are the same as in FIG. 11 described with the modification of the first embodiment, and also has steps ST350 and ST355 executed between steps ST325 and ST360.

In step ST325, in a case where determination is made that a data value in the search direction, obtained from the two-dimensional data in the two-dimensional data memory 34, is an on data value, the region identifying unit 27 calculates an evaluation value for determining whether or not that search direction can be moved in, based on a detection data value of the two-dimensional data stored in the two-dimensional data memory 33 (ST350). In the region identifying unit 27 determines whether or not that search direction can be moved in, based on the evaluation value (ST355), and in a case of determining that moving can be performed, advances to step ST360. In a case of determining that moving cannot be performed, the region identifying unit 27 advances to step ST340.

Figures 15A, 15B:

FIGS. 15A and 15B are diagrams illustrating an example of two-dimensional data generated at the two-dimensional data generating unit 22 and two-dimensional data after conversion at the data conversion unit 25. FIG. 15A illustrates two-dimensional data generated at two-dimensional data generating unit 22, and FIG. 15B illustrates two-dimensional data obtained by converting the two-dimensional data in FIG. 15A by the data conversion unit 25.

For example, in a case of performing outline tracking of the two-dimensional data after conversion illustrated in FIG. 15B using the input device according to the first embodiment, the entire region surrounded by heavy lines in FIG. 15B is identified as a region corresponding to a single object. However, closely observing the numerical values of the two-dimensional data illustrated in FIG. 15A reveals that there are three peak coordinates (X3, Y3), (X6, Y3), and (X3, Y6) in this region. While the intermediate portions therebetween are determined to be on data, but are trough regions where the detection data values are lower. A detection data value pattern having such a trough region readily occurs at gaps between objects in a case where multiple objects come into contact (proximity) with the operating face in a state of being close together. Accordingly, the region identifying unit 27 may calculate an evaluation value based on the group of detection data arrayed in the line in the search direction, to check whether or not there is such a gap between objects in the search direction.

That is to say, preferably, the region identifying unit 27 acquires detection data corresponding to the search point, the next search point candidate in the search direction, at least one search direction point adjacent to the search direction as seen from the next search point candidate, and at least one reverse search direction point adjacent to a reverse direction to the search direction as seen from the search point, from the two-dimensional data stored in the two-dimensional data memory 33. The region identifying unit 27 may calculate an evaluation value, indicating the relationship in magnitude between a degree of contact or proximity of an object at the search point and the next search point candidate, and a degree of contact or proximity of an object at the search direction point and the reverse search direction point, based on the acquired group of detection data. In a case where the degree of contact or proximity of an object at the search point and the next search point candidate, is smaller than the degree of contact or proximity of an object at the search direction point and the reverse search direction point, by a certain level in this evaluation value, the search point and the next search point candidate may be estimated to be situated in a gap between objects, so the region identifying unit 27 may determine that it cannot move in that search direction.

Specifically, the region identifying unit 27 preferably calculates the evaluation value by adding a value obtained by multiplying each of the detection data values corresponding to the search point and the next search point candidate by a first coefficient K1, and a value obtained by multiplying each of the detection data values corresponding to the search direction point and the reverse search direction point by a second coefficient K2 (where "K2" has the opposite sign of "K1"). The region identifying unit 27 may determine whether moving in the search direction is be performed in accordance with the result of comparing the calculated evaluation value with a threshold value.

FIGS. 16A through 16D are diagrams illustrating examples of coefficients to calculate evaluation values. FIG. 16A illustrates a case where the search direction is "0 (right)", FIG. 16B illustrates a case where the search direction is "1 (down)", FIG. 16C illustrates a case where the search direction is "2 (left)", and FIG. 16D illustrates a case where the search direction is "3 (up)". In the example in FIG. 16, the coefficient K1 by which the detection data values corresponding to the search point and next search point candidate are multiplied is "1", and the coefficient K2 by which the detection data values corresponding to the search direction point and reverse search direction point are multiplied is "−1".

Figures 18A, 18B, 18C, 18D:
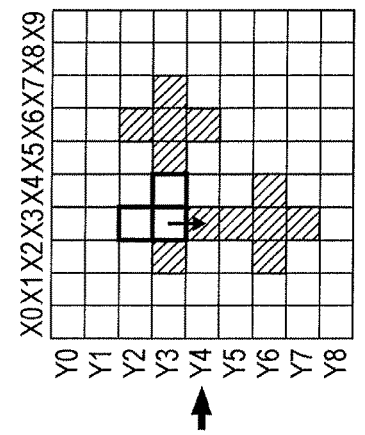
FIGS. 18A through 18H are diagrams for describing a specific example of outline tracking in a case of determining whether movement in a search direction can be made based on evaluation value.
Figures 18E, 18F, 18G, 18H:
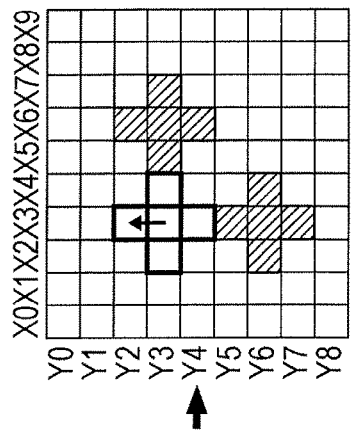

A specific example of outline tracking by the input device according to the present embodiment will be described with reference to FIGS. 17 through 18H. FIG. 17 is a diagram illustrating an example of processing to search for on data values within two-dimensional data, in the outline tracking according to the present embodiment. FIGS. 18A through 18H are diagrams for describing a specific example of outline tracking in a case of determining whether movement in a search direction can be made based on evaluation value.

The on data value search processing in FIG. 17 is performed in the same way as in FIG. 12, where rows are selected in order from the top to the bottom of the operating face, and on data values are searched in order from the left end to the right end of the selected row. The first on data value has been found at the position of coordinates (X3, Y2).

First, the region identifying unit 27 searches the two-dimensional data as illustrated in FIG. 17, and takes the data value of the coordinates (X3, Y2) where an on data value is first found, as the starting point of the outline tracking. The region identifying unit 27 sets this starting point as a search point, sets the direction "0 (right)" as the first search direction, and searches for an on data value in the clockwise direction. Upon the first on data value being found by the search in the direction "1 (down)", the region identifying unit 27 calculates an evaluation value in the direction "1 (down)". Referencing the detection data values illustrated in FIG. 15A and the coefficient values illustrated in FIG. 16B yields that the evaluation value in this case is calculated by "−10+50+99−85", so the value thereof is "54". The region identifying unit 27 determines that moving can be performed in a case where this evaluation value is greater than "−20", for example, and determines that moving cannot be performed if smaller. Accordingly, in this case, the region identifying unit 27 determines that movement can be made in the direction "1 (down)". The region identifying unit 27 moves the search point to coordinates (X3, Y3) in the direction "1 (down)" (FIG. 18B).

Next, the region identifying unit 27 sets the direction "0 (right)" to the left side of the direction "1 (down)" as the search direction. There is an on data value at "0 (right)", so the region identifying unit 27 calculates an evaluation value in the direction "0 (right)". Referencing the detection data values illustrated in FIG. 15A and the coefficient values illustrated in FIG. 16A yields that the evaluation value in this case is calculated by "−52+99+79−72", so the value thereof is "54". Accordingly, the region identifying unit 27 determines that movement can be made in the direction "0 (right)". The region identifying unit 27 moves the search point to coordinates (X4, Y3) in the direction "0 (right)" (FIG. 18C).

Next, the region identifying unit 27 sets the direction "3 (up)" to the left side of the direction "0 (right)" as the search direction, and searches for an on data value in the clockwise direction. The first on data value being found by the search is in the direction "0 (right)", so the region identifying unit 27 calculates an evaluation value in the direction "0 (right)". Referencing the detection data values illustrated in FIG. 15A and the coefficient values illustrated in FIG. 16A yields that the evaluation value in this case is calculated by "−99+79+72−98", so the value thereof is "−46". The region identifying unit 27 determines that moving cannot be performed in the direction "0 (right)". Accordingly, the region identifying unit 27 further changes the search point in the clockwise direction, and finds an on data value being in the direction "2 (left)". The region identifying unit 27 then calculates an evaluation value in the direction "2 (left)". The evaluation value in this case is calculated by "−52+99+79−72", so the value thereof is "54". Accordingly, the region identifying unit 27 determines that movement can be made in the direction "2 (left)". The region identifying unit 27 moves the search point to coordinates (X3, Y3) in the direction "2 (left)" (FIG. 18D).

Thereafter, the region identifying unit 27 moves the search point to "1 (down)", "3 (up)", "2 (left)", "0 (right)", and "3 (up)", and returns to the original starting point coordinates (X3, Y2) (FIGS. 18D to 18H). Due to having moved the search point in the search direction "3 (up)" and thus has returned to the starting point, so the region identifying unit 27 takes the direction "2 (left)" which is to the left of the direction "3 (up)", as a new search direction, but the data value in this search direction is an off data value. The search point is equal to the starting point, and the search direction is "2 (left)", so the region identifying unit 27 ends the outline tracking processing.

Figures 19A, 19B, 19C:
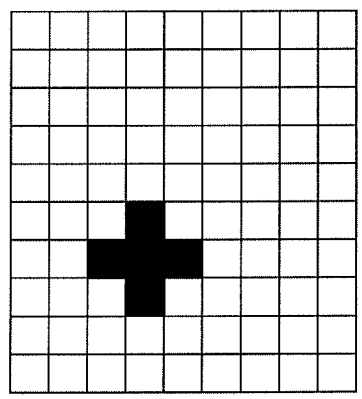
FIGS. 19A through 19C are diagrams illustrating processing to update on data values, within a set region obtained by the outline tracking illustrated in FIGS. 18A through 18H, to off data values.

FIGS. 19A through 19C are diagrams illustrating processing to update on data values, within a set region obtained by the outline tracking illustrated in FIGS. 18A through 18E, to off data values. In FIGS. 19A through 19C, a partial region having a detection data value peak on coordinates (X3, Y3) is identified by outline tracking among from the regions where on data values are continuous, and distinguished from the other regions.

As described above, according to the input device of the present embodiment, in the outline tracking processing of a set region of on data values, detection data corresponding to the search point in the search direction, the next search point candidate, at least one search direction point adjacent to the search direction as seen from the next search point candidate, and at least one reverse search direction point adjacent to a reverse direction to the search direction as seen from the search point, are preferably acquired from the two-dimensional data generated by the two-dimensional data generating unit 22. An evaluation value, indicating the relationship in magnitude between a degree of contact or proximity of an object at the search point and the next search point candidate, and a degree of contact or proximity of an object at the search direction point and the reverse search direction point, may be calculated based on the acquired group of detection data. In a case where the degree of contact or proximity of an object at the search point and the next search point candidate, is smaller than the degree of contact or proximity of an object at the search direction point and the reverse search direction point, by a certain level, the search point and the next search point candidate may be estimated to be situated in a gap between objects, so determination may be made that movement cannot be made in that search direction.

Thus, determination is not made based on one detection data value alone, but on a tendency of a group of detection data values adjacent thereto, to determine whether or not gaps exist between objects in the search direction for outline tracking. Accordingly, outline tracking is prevented from being performed over a gap, so even in a case where multiple objects come into contact or proximity with the operating face in a state of being close together, the contact region or proximity region of each object can be accurately identified.

While the present invention has been described with reference to several embodiments, the present invention is not restricted to the above embodiments, and encompasses various variations.

For example, while description has been made in the above embodiments that all of the two-dimensional data generated by the two-dimensional data generating unit 22 is converted into on data values and off data values at the data conversion unit 25 before performing outline tracking by the region identifying unit 27, this conversion by the data conversion unit 25 may be omitted in another embodiment of the present invention. In this case, the region identifying unit 27 performs determination of whether detection data values are on data values or off data values in the process of performing outline tracking.

Specifically, the conversion processing by the data conversion unit 25 in step ST100 is omitted from the flowchart in FIG. 2, for example.

In step ST115 (FIG. 2), the region identifying unit 27 sequentially acquires each detection data value of the two-dimensional data stored in the two-dimensional data memory 33 from an edge of the operating face. Next, in step ST120, the region identifying unit 27 determines whether or not the acquired detection data value is an on data value based on comparison with a threshold value, and in a case where determination is made that the detection data value is an on data value, advances to step ST130. In a case where determination is made that the detection data value is an off data value, the region identifying unit 27 advances to step ST125.

Further, in step ST150 of the flowchart in FIG. 2, the two-dimensional data updating unit 26 updates detection data values, belonging to a set region in the two-dimensional data stored in the two-dimensional data memory 33 regarding which outline tracking has been performed, to values which will be determined to be off data values by the region identifying unit 27.

Moreover, in step ST220 of the flowchart in FIG. 5 (and also the same with step ST320 of the flowcharts in FIGS. 11 and 14), the region identifying unit 27 acquires detection data values in the search direction from the two-dimensional data stored in the two-dimensional data memory 33. Next, in step ST225 (step ST325), the region identifying unit 27 determines whether or not the acquired detection data value is an on data value, based on comparison with a threshold value, and in a case of determining that this is an on data value, advances to step ST260 (ST360). In a case of determining that this is an off data value, the region identifying unit 27 advances to step ST230 (ST330).

While the above-described second embodiment describes an example where an evaluation value for four directions is calculated in a case where four search directions are set in the outline tracking, but this present invention is not restricted to this example. In a case where eight search directions are set in the outline tracking, an evaluation value for eight directions is calculated to determine whether or not moving can be performed.

What is claimed is:

1. An input device to input information according to a condition of contact or proximity of an object with an operating face thereof, the input device comprising:
   a sensor unit configured to detect contact or proximity of an object at a plurality of detection positions distributed on the operating face;
   a two-dimensional data generating unit configured to generate two-dimensional data made up of a plurality of detection data values representing the condition of contact or proximity of the object at a plurality of positions on the operating face, based on detection results at the sensor unit;
   a data conversion unit configured to convert each of the plurality of detection data values included in the two-dimensional data into either of an on data value, which indicates contact or proximity of an object, and an off data value, which indicates no contact or proximity of an object;
   a region identifying unit configured to:
      sequentially acquire each converted data value of the two-dimensional data from an edge of the operating face,
      determine whether or not the on data value,
   and if an acquired data value is an on data value,
      set the acquired data value as a starting point,
      track an outline of a set region where adjacent on data values form a set, starting from the starting point and sequentially tracking the outline until returning to the starting point, and
      identify a region where one object has come into contact or proximity with the operating face, based on the outline tracking results, and
   a two-dimensional data updating unit configured to update on data values, belonging to the set region in the converted two-dimensional data of which the outline has been tracked, into off data values, each time outline tracking of the set region is performed by the region identifying unit,
   wherein, in a case where a data value regarding which determination has not been made yet regarding whether or not an on data value exists in the converted two-dimensional data when the updating of the two-dimensional data is performed by the two-dimensional data updating unit, the region identifying unit:
      sequentially acquires this unidentified data value and performs the determining,
   and if the acquired data value is an on data value,
      performs the outline tracking with this acquired data value as a new starting point.

2. An input device to input information according to a condition of contact or proximity of an object with an operating face thereof, the input device comprising:

a sensor unit configured to detect contact or proximity of an object at a plurality of detection positions distributed on the operating face;

a two-dimensional data generating unit configured to generate two-dimensional data made up of a plurality of detection data values representing the condition of contact or proximity of the object at a plurality of positions on the operating face, based on detection results at the sensor unit;

a region identifying unit configured to:
sequentially acquire each detection data value in the two-dimensional data from an edge of the operating face,
determine whether or not the data value indicates contact or proximity of an object,
and if an acquired detection data value indicates contact or proximity of an object,
set the acquired detection data value as a starting point,
track an outline of a set region where adjacent detection data values indicating contact or proximity of an object form a set, starting from the starting point and sequentially tracking the outline until returning to the starting point, and
identify a region where one object has come into contact or proximity with the operating face, based on the outline tracking results, and a two-dimensional data updating unit configured to update detection data values, belonging to the set region in the two-dimensional data of which the outline has been tracked, into detection data values indicating no contact or proximity of an object, each time outline tracking of the set region is performed by the region identifying unit, wherein, in a case where a detection data value regarding which determination has not been made yet exists in the two-dimensional data when the updating of the two-dimensional data is performed by the two-dimensional data updating unit, the region identifying unit:
sequentially acquires this unidentified detection data value and performs the determining,
and if the acquired data value indicates contact or proximity of an object,
performs the outline tracking with this acquired detection data value as a new starting point.

3. The input device according to claim 1,
wherein the region identifying unit
sets an outline point found in the searching for outline points forming an outline of the set region in order from the starting point, as a search point,
and if a search direction indicating a position of a search point candidate as seen from the search point has been set,
extracts, from the two-dimensional data generated at the two-dimensional data generating unit, the detection data corresponding to:
the search point,
the next search point candidate,
at least one search direction point adjacent to the search direction as seen from the next search point candidate, and
at least one reverse search direction point adjacent to a reverse direction to the search direction as seen from the search point,
calculates, based on the acquired group of detection data, an evaluation value indicating the relationship in magnitude between:
a degree of contact or proximity of an object at the search point and the next search point candidate, and
a degree of contact or proximity of an object at the search direction point and the reverse search direction point, and
determines, based on the calculated evaluation value, whether or not the next search point candidate can be set as a search point.

4. The input device according to claim 3,
wherein the region identifying unit calculates the evaluation value by adding:
a value obtained by multiplying each of the detection data values corresponding to the search point and the next search point candidate by a first coefficient, and
a value obtained by multiplying each of the detection data values corresponding to the search direction point and the reverse search direction point by a second coefficient, of which the sign is opposite that of the first coefficient.

5. An information input method performed at an input device to input information according to a condition of contact or proximity of an object with an operating face thereof, the method comprising:
detecting a state of contact or proximity of an object at a plurality of detection positions distributed on the operating face;
generating two-dimensional data made up of a plurality of detection data values representing the condition of contact or proximity of the object at a plurality of positions on the operating face, based on detection results at the plurality of detection positions;
converting each of the plurality of detection data values included in the two-dimensional data into either of an on data value, which indicates contact or proximity of an object, and an off data value, which indicates no contact or proximity of an object;
sequentially acquiring each converted data value of the two-dimensional data from an edge of the operating face and determining whether or not the on data value;
if an acquired data value from the two-dimensional data is determined to be an on data value in the determining, set the acquired data value as a starting point,
tracking an outline of a set region where adjacent on data values form a set, starting from the starting point and sequentially tracking the outline until returning to the starting point, and identify a region where one object has come into contact or proximity with the operating face, based on the outline tracking results, and
updating on data values, belonging to the set region in the converted two-dimensional data of which the outline has been tracked, into off data values, each time outline tracking of the set region is performed by the identifying a region,
wherein, in a case where a data value regarding which determination has not been made yet regarding whether or not an on data value exists in the converted two-dimensional data when the updating of the two-dimensional data is performed by the updating the converted two-dimensional data, this unidentified data value is sequentially acquired and the determining is performed by the determining, and
wherein, each time the on data value is found in the step to determine, the outline tracking is performed by the identifying a region, with the found on data value as a new starting point.

6. An information method performed at an input device to input information according to a condition of contact or proximity of an object with an operating face thereof, the method comprising:

- detecting a state of contact or proximity of an object at a plurality of detection positions distributed on the operating face;
- generating two-dimensional data made up of a plurality of detection data values representing the condition of contact or proximity of the object at a plurality of positions on the operating face, based on detection results at the plurality of detection positions;
- sequentially acquiring each detection data value in the two-dimensional data from an edge of the operating face, and determining whether or not the data value indicates contact or proximity of an object;
- if a detection data value acquired from the two-dimensional data has been determined to indicate contact or proximity of an object, setting the acquired detection data value as a starting point, tracking an outline of a set region where adjacent detection data values indicating contact or proximity of an object form a set, starting from the starting point and sequentially tracking the outline until returning to the starting point, and identifying a region where one object has come into contact or proximity with the operating face, based on the outline tracking results by the determining, and
- updating detection data values, belonging to the set region in the two-dimensional data of which the outline has been tracked, into data values indicating no contact or proximity of an object in the step to determine, each time outline tracking of the set region is performed by the to identifying a region, wherein, in a case where a detection data value regarding which determination has not been made yet exists in the two-dimensional data when the updating of the two-dimensional data is performed by updating the two-dimensional data, this unidentified detection data value is sequentially acquired and the determining is performed by the determining, and wherein, each time the detection data value indicating contact or proximity of an object is found in the step to determine, the outline tracking is performed by the step to identifying a region, with this found detection data value as a new starting point.

* * * * *